March 31, 1959   W. WITTE   2,880,306
ELECTRICAL APPLIANCES
Filed March 1, 1956   2 Sheets-Sheet 2

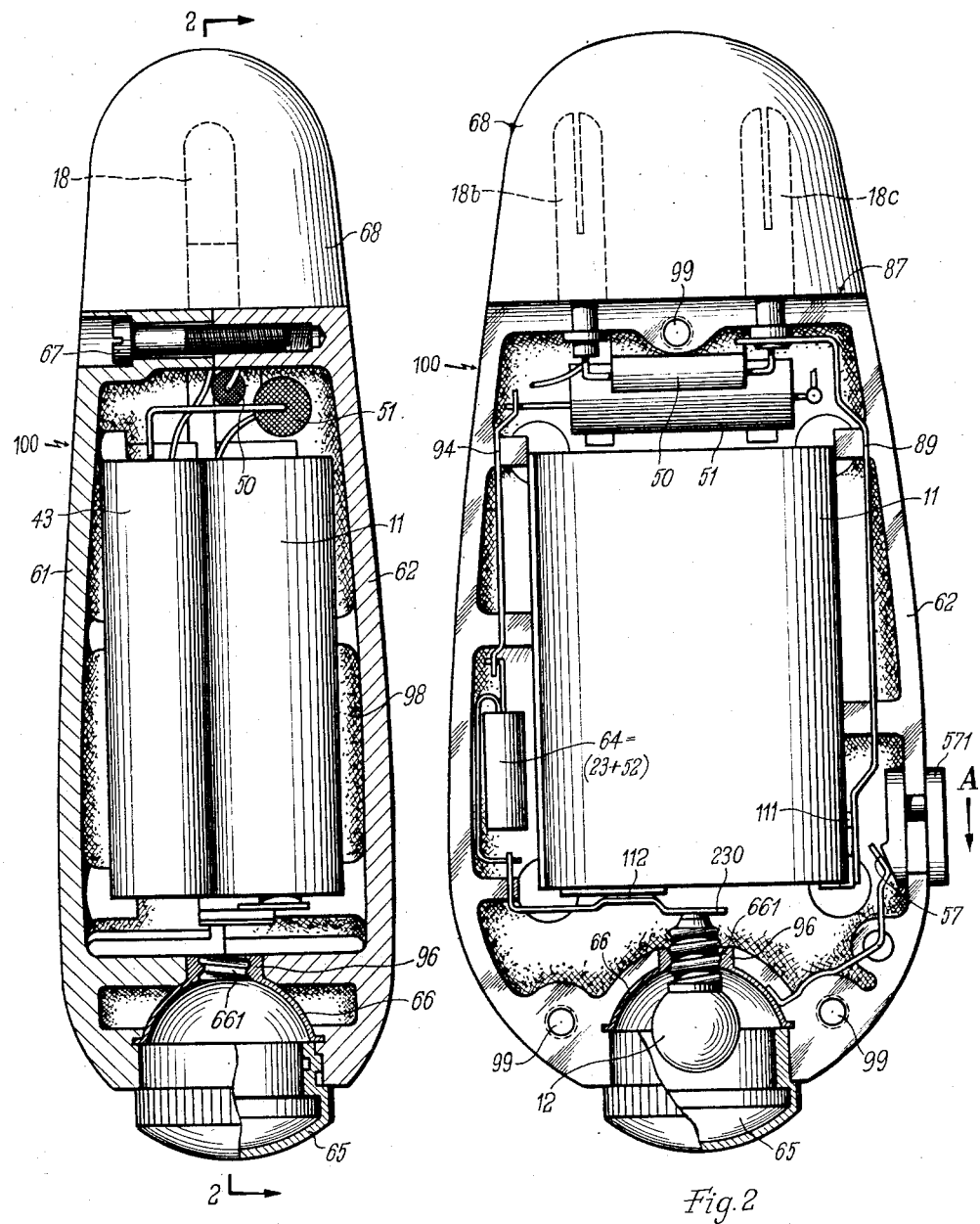

Inventor:
Waldemar WITTE
Attorney

United States Patent Office 2,880,306
Patented Mar. 31, 1959

2,880,306

ELECTRICAL APPLIANCES

Waldemar Witte, Murrhardt, Germany

Application March 1, 1956, Serial No. 568,800

Claims priority, application Germany October 15, 1955

8 Claims. (Cl. 240—10.65)

This invention relates to low power consuming electrical appliances with chargeable built-in storage battery arrangement and is particularly concerned with electrical appliances of the kind referred to which frequently are used in locations in which no suitable source of electric power is present, that is for example flash lights, electric razors, flash devices for photographic purposes and the like appliances.

It is an object of the invention to provide electric appliances of the kind referred to which may be directly charged by connection to a suitable source of current, i. e. for example the power supply line of a building, the electrical outlets on the dash-board of a motor car and the like.

A further object of the invention is the provision of electric appliances of the kind described which do not become unduly hot during operation, so that the housing of the appliances may be made from synthetic or plastic material.

A still further object of the invention is to provide electric appliances of the kind referred to which in addition to the chargeable storage battery arrangement also comprise a rectifying arrangement for rectifying the current and reducing it to the desired voltage.

Still a further object of the invention is the provision of electric appliances of the kind referred to which comprise protecting means for protecting the electrical arrangement of the device from harmful excess voltages and overload.

Another object of the invention is the provision of electric appliances of above referred kind which are easily and inexpensively manufactured and of sturdy construction.

Finally, it is an object of the invention generally to improve on the art of low power consuming electric appliances of the kind referred to as now customarily built.

Figure 3:
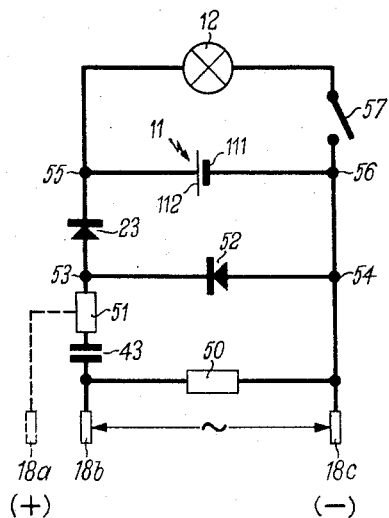
Figure 4:
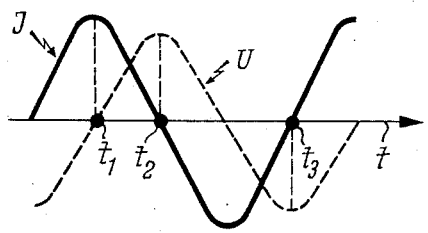

Other objects and structural details of the invention will be apparent from the following description forming part of this specification when read in conjunction with the accompanying drawings, in which:

Fig. 1 is a longitudinal section through an embodiment of an inventive flash light, the section being taken along one of the planes of symmetry of the flash light, and a portion of the closure cap of the flash light being shown in elevation, Fig. 2 is a longitudinal section through the same embodiment, the plane of the section being turned through 90° relative to the plane of Fig. 1, Fig. 3 is a wiring diagram of the embodiment of Figs. 1 and 2, and Fig. 4 is a diagram showing the sine shaped course of the voltage and the leading current of the embodiment.

Referring now to the drawings and in particular to Figs. 1 and 2, reference numeral 100 generally indicates a flash light constructed in accordance with the invention. The flash light comprises a casing constituted by two casing halves 61 and 62, respectively. The two casing halves are held together by screws 67 screwed into threaded bores 99. The casing 61, 62 is partly of substantially parabolic outline both in the viewing direction of Fig. 1 and that of Fig. 2. The casing forms a central chamber 98 merging into a recess portion 96. A condenser or capacitor 43 and a chargeable small storage battery 11 are arranged adjacent each other within the chamber 98. A double rectifier is indicated at 64. The double rectifier 64 is in fact comprised of two rectifiers 23 and 52 as indicated in the wiring diagram of Fig. 3. A discharge resistance 50 and a resistance 51 are mounted within the casing 61, 62 in the region of the ends of contact pins 18b, 18c projecting into the chamber of the casing 61, 62. The resistance 50 is directly connected to the contact pins 18b, 18c. A switch 57 having a bent portion 93 is provided inside the casing 61, 62 near the wall of the latter. The switch 57 is operated by a sliding button 571 slidingly mounted on the wall of the casing. The switch 57 is connected to a reflector 66 which latter is inserted into the recess portion 96 formed by the united casing halves 61 and 62 on the lamp side of the flashlight. A bulb 12 or the like is mounted in a socket portion 661 of the reflector 66. As is customary in flash lights, the reflector 66 with the bulb 12 is covered by a closure cap 65 having a cover lens.

The positive pole of the storage battery 11 is indicated by reference numeral 112. A strip 230 of the main rectifier 23 bears against the positive pole 112. The free end of the strip 230 forms the lower contact for the bulb 12. A connection 94 leads from the main rectifier 23 to the resistance 51 and from the latter across the condenser 43 to the contact pin 18b.

When the sliding button 571 is pushed towards the front of the flash light, that is in the direction of the arrow A, the former urges the bent portion 93 of the switch 57 into contact with the wall of the storage battery 11 which constitutes the negative pole 111. The wall of the storage battery 11 is connected through a line 89 with the contact pin 18c. The line 89 in turn is connected with the discharge resistance 50 and the cross rectifier 52.

As shown in Figs. 1 and 2, the contact pins 18b and 18c project from a plane rear end face 87 of the casing 61, 62 and are received in two recesses 18 provided for that purpose in a removable cap or hood 68. The cap 68 supplements the casing 61, 62 in such a manner that it includes the apex portion of the parabolic outline of the of the flash light. The cap 68 may be manufactured from the same material as the casing 61, 62.

The operation of the flash light embodied in Figs. 1 and 2 will now be elucidated by means of the wiring diagram of Fig. 3 and the course of the voltage-current shown in Fig. 4.

A single-phase alternating voltage is applied to the input side of the main rectifier 23 across the contact pins 18b and 18c. This input side of the rectifier comprises the condenser 43 and the resistance 51 in series with the contact pins.

A corresponding current flows from the resistance 51 across the point 53 to the main rectifier 23 and from the main rectifier 23 to the positive pole 112 of the storage battery 11, since the switch 57 is open and the lamp circuit across the lamp 12 is thus interrupted. The course of the current leads from the negative pole 111 of the storage battery 11 across the points 56, 54 back to the contact pin 18c. A small branching towards the resistance 50 takes place, since this is a very high-ohmic resistance.

Rectification by the main rectifier 23 takes place when the positive half-wave of a cycle of the alternating voltage is applied to the input side and thus to the effective resistance 51. When this is the case, no current can flow from the point 53 in the direction of the cross rectifier 52 since the latter is situated in the reversed or blocked direction. When the negative half-wave of a cycle of the alternating voltage is applied to the input side and thus to the effective resistance 51, then no current can flow from the point 53 across the main rectifier 23. To the latter then is applied a blocking or reversed voltage which in the most disadvantageous case may amount to about 310 v. This voltage peak is reduced on the one hand by the resistance 51 and on the other hand by the cross rectifier 52. The cross rectifier 52 acts in this case as a valve, since the positive half-wave of the cycle of the alternating voltage is applied thereto simultaneously and thus prevents overloading of the main rectifier 23. The cross rectifier thus accomplishes the task of protecting the main rectifier 23 from overload. The resistance 51 prevents the occurrence of increased voltage peaks at the rectifiers 23 and 52 and moreover acts at the moment of closing the circuit as a current damper.

The dash-dotted lines in Fig. 3 indicate a tap at the resistance 51. A portion of the resistance 51 and the condenser 43 are bridged by switching means (not shown). In this manner it is possible to connect the flash light through the contact pin 18a as positive pole and the contact pin 18c as negative pole to the electrical outlets on the dash-board of a motor car or the like.

The previously mentioned high-ohmic discharge resistance 50, which is connected in parallel with the contact pins 18b and 18c, is designed to prevent possible condenser discharges through the body of the user of the flash light when the contact pins are pulled out from the network, i. e. the source of current. In case selenium rectifiers of relatively recent construction are employed which selenium rectifiers have relatively small reverse or blocking currents, the storage battery may continuously be connected to the charging source, while the bulb is continuously lit.

Voltages of about 2 volts only occur at the rectifiers 23 and 52 during operation of the flash light both in forward and reverse direction.

The conditions, however, are different at the very moment of closing the circuit with regard to the instant chosen for so closing the circuit. This is illustrated in Fig. 4 by the different instants $t_1$, $t_2$ and $t_3$ for closing the circuit. In case the circuit is closed at the instant $t_1$, the current jumps quickly to a high value of curve J while the voltage U increases gradually, so that the steady state exists immediately without the occurrence of overload.

However, when the circuit is closed at the instant $t_2$, the current is zero, since at this moment $du/dt=0$ ($u$ designating the alternating charging voltage) and $U_{max}=310$ v. The increase in the voltage takes place so quickly, that the condenser 43 practically constitutes a resistance value of zero. The series resistance 51 now takes up the entire voltage of the power line, while the drop in voltage occurs only in the forward direction at one of the rectifiers 23 and 52 which drop at the same time constitutes the reverse voltage for the other rectifier. No harmful excess voltage can form at the two rectifiers, since one of the two rectifier branches is met in forward direction at each instant for closing the circuit.

The same conditions are observed in case the points for closing the circuits shown in Fig. 4 are displaced in each case a distance corresponding to half a cycle or a multiple thereof. In case an instant for closing the circuit is chosen which instant is situated between $t_1$ and $t_3$, then an increased stress is observed which becomes the greater the more the instant approaches the instant $t_2$.

In case the cross rectifier branch 52 would be replaced by a resistance, then this resistance jointly with the series resistance 51 would act as a voltage divider. On closing the circuit at the instant $t_3$, a high voltage of considerably more than 100 volts would then occur at the points 53 and 54, which voltage would be applied to the rectifier 23 in the reversed or blocking direction. This is effectively prevented by the cross rectifier 52 provided instead of a resistance, which cross rectifier leads the excess voltage away by means of its resistance in the forward direction. Only the main rectifier 23 acts as charging rectifier proper while the sole purpose of the cross rectifier 52 is to protect the rectifier 23 from harmful excess voltages at a time of a disadvantageous coinciding of a maximum value of the voltage of the power line with the corresponding voltage direction.

Known selenium rectifiers as well as germanium diodes may be employed as rectifiers. The cross rectifier 52 which protects the main rectifier 23 from harmful excess voltage may be replaced by varistors.

The employment of the condenser 43 on the input side of the rectifying arrangement results moreover in the advantage that due to the phase-displacing effect, an improvement of $\cos \varphi$ is obtained.

Although the invention has been described in connection with a flash light, it is emphasized that the invention may be equally employed in other electric appliances consuming low power and having a built-in storage battery, such as electric razors, flash light lamps and the like.

From the above it will be realized that the rectifying arrangement used in the inventive construction is of such a kind, that for the purpose of reducing the voltage of the power supply to the voltage necessary for charging, a capacity is provided which is connected in series with a resistance, whereby an effective alternating voltage can be tapped from said resistance which voltage is rectified by the main rectifier. In other words, condenser 43 has a capacity of such a value that it reduces the voltage of the source of power connected to terminals 18b and 18c to such an extent that the magnitude of the voltage becomes suitable for charging the battery. Advantageously, a further cross rectifier is connected in series with said resistance. This cross rectifier serves the purpose to protect the main rectifier from harmful excess reverse voltage.

With a view to rendering it possible to charge the appliance by connecting it to the electrical outlets on the dash-board of a motor car or the like, it is within the scope of the invention to provide a tap on the damping resistance which tap may be connected to the source of current.

Moreover, sensitive persons are often disturbed by the fact that on touching the contact pins immediately after disconnecting the appliance from the source, a condenser discharge can be felt across the body of the user. This troublesome phenomenon is eliminated in accordance with a feature of the invention by providing a discharge resistance between the poles of the contact pins.

Considering the fact that selenium rectifiers of relatively modern construction exhibit extremely small reversed currents, the arrangement may be adapted in such a manner, that the storage battery is continuously connected to the charging arrangement. This means that the bulb—in case the appliance is a flash light—may burn even while the storage battery is being charged and that no change-over switch subject to defects and disturbances need be provided.

The contact pins are advantageously mounted on the casing in rigid manner and project therefrom. A protecting cap or hood may surround the projecting portion of the contact pins, said cap being mounted on the casing while the outlines of the casing and the cap merge into each other without any gap therebetween.

I have described a preferred embodiment of my invention, but it is understood that the disclosure is by way of illustration rather than by way of limitation and that various omissions and changes in shape, proportion and arrangement of parts, as well as the substitution of equivalent elements for those herein shown and described may be made without departing from the spirit and scope of the invention as set forth in the appended claims.

The term "low power consuming appliances" as used in this specification and the appended claims means electrical appliances which use relatively small currents and require low voltage.

What I claim is:

1. A flashlight, comprising a casing, a storage battery in said casing and provided with negative and positive poles, a light bulb carried by said casing at one part thereof and electrically connected across said battery, a manually operable switch mounted on said casing and accessible from the exterior of the latter for opening and closing the circuit between said battery and said light bulb, a pair of prongs immovably carried by said casing at another part thereof and projecting therefrom for insertion into a standard socket connected to a source of A.C. voltage, one of said prongs being directly connected to said negative pole of said battery, rectifying means consisting of first and second selenium rectifiers having respective input and output terminals, said output terminal of said first rectifier being connected to said positive pole of said battery, means for reducing the voltage applied to said prongs to the value required for charging said battery, said voltage reducing means consisting of a voltage peak-limiting resistor having one terminal connected to said input terminal of said first rectifier, and a voltage-dropping capacitor connected to another terminal of said voltage peak-limiting resistor and in series with the same and the other of said prongs, said input terminal of said second rectifier being connected to said one prong and to said negative pole of said battery, said output terminal of said second rectifier being connected to said input terminal of said first rectifier and to said one terminal of said voltage peak-limiting resistor, and a bleeder resistor having one terminal connected directly to said one prong and another terminal connected directly to said other prong, said battery, rectifiers, capacitor and resistors being immovably mounted adjacent one another within the casing in close relationship so that they form a compact assembly.

2. A flashlight including a casing having therewithin a storage battery, a light source electrically connected across said battery, switch means connected in the circuit between said battery and said light source for connecting the latter to and disconnecting the same from said battery, and a pair of electrical contacts connected in series with said battery and immovably mounted in said casing and constructed for insertion into a standard socket connected to a source of A.C. power, a charging system for said storage battery having rectifier means consisting only of solid dry rectifier means, said charging system comprising first dry rectifier means connected directly to the battery, voltage peak-limiting resistor means and voltage dropping capacitor means all connected in series with one another as well as with said battery and said contacts, and second dry rectifier means connected in parallel with said series connected battery and from one of said contacts to a point between said resistor means and said first rectifier means, whereby said charging system effects substantially without generation of heat resulting from electric current flow a reduction of charging voltages applied to said contacts and therethrough to said battery while simultaneously preventing overloading of said first dry rectifier means, said battery and the elements of said charging system being immovably mounted adjacent one another within said casing in close relationship so that they form a compact assembly, said voltage peak-limiting resistor means and said voltage-dropping capacitor means constituting the sole means for reducing the voltage applied to said contacts to the value required to charge said battery.

3. A flashlight including a casing having therewithin a storage battery, a source of light electrically connected across said battery, switch means connected in the circuit between said battery and said light source for connecting the latter to and disconnecting the same from said battery, and a pair of electrical contacts immovably mounted in said casing connected in series with said battery and constructed for insertion into a standard socket connected to a source of A.C. power, a charging system for said storage battery having rectifier means consisting only of dry solid rectifier means, said charging system comprising first dry rectifier means, voltage peak-limiting resistor means and voltage-dropping capacitor means all connected in series with one another as well as with said battery and said contacts, second dry rectifier means connected in parallel with said battery and said first rectifier means and from one of said contacts to the junction between said voltage peak-limiting resistor means and said first dry rectifier means, and bleeder resistor means connected directly across said contacts and thus in parallel with said second dry rectifier means and with said battery, whereby said charging system effects substantially without generation of heat resulting from electric current flow a reduction of charging voltages applied to said contacts and therethrough to said battery while simultaneously preventing overloading of said first rectifier means, said battery and the elements of said charging system being immovably mounted adjacent one another within said casing in close relationship so that they form a compact assembly, said voltage peak-limiting resistor means and said voltage-dropping capacitor means constituting the sole means for reducing the voltage applied to said contacts to the value required to charge said battery.

4. A flashlight including a casing having therewithin a storage battery, a light source electrically connected across said battery, switch means connected in the circuit between said light source and said battery for connecting the light source to and disconnecting the same from said battery, and a pair of electrical contacts immovably mounted in said casing and connected in series with said battery and constructed for insertion into a standard socket connected to a source of A.C. power, a charging system for said storage battery having rectifier means consisting only of solid dry rectifier means, said charging system comprising a main dry rectifier connected directly to said battery so as to permit current flow only in the direction of said battery, a voltage peak-limiting resistor connected directly to said main dry rectifier, a voltage-dropping capacitor connected directly to said resistor and to one of said contacts, whereby said capacitor, said resistor and said main dry rectifier are all connected in series with one another as well as with said battery and said contacts, and a protective dry rectifier connected in parallel with said battery and from the other of said contacts to the junction between said resistor and said main dry rectifier so as to permit current flow only in the direction of said junction, whereby said charging system effects substantially without generation of heat resulting from electric current flow a reduction of charging voltages applied to said contacts and therethrough to said battery while simultaneously preventing overloading of said main rectifier, said battery and the elements of said charging system being immovably mounted in said casing in close relationship so that they form a compact assembly, said resistor and capacitor constituting the sole means of reducing the voltage applied to said contacts to the value required for charging said battery.

5. A flashlight according to claim 4, having an additional resistor connected directly across said contacts for bleeding from said capacitor any charge remaining thereon subsequent to termination of the battery charging operation.

6. A flashlight according to claim 5; said contacts comprising a pair of rigid prongs projecting from said casing, said casing including a protective cap provided with two recesses arranged to receive and cover said prongs when the same are not in use during the battery charging operation, said casing and said cap being complementarily shaped to constitute a smooth-surfaced substantially conically tapering entity when said cap is mounted on said prongs.

7. A flashlight comprising a casing, a rechargeable storage battery in said casing, a lamp carried by said casing at one part thereof and electrically connected across said battery, a manually operable switch mounted on said casing and accessible from the exterior of the latter for opening and closing the circuit between said battery and said lamp, a pair of prongs immovably carried by said casing at another part thereof and projecting therefrom for insertion into a socket connected to a source of A.C. voltage, battery charging means for converting the A.C. voltage of said source to a much lower D.C. voltage impressed across the battery, said charging means having rectifier means consisting solely of dry rectifier means, said charging means comprising a first dry rectifier, voltage peak-limiting resistor means and voltage-dropping capacitor means all connected in series with one another as well as with said battery from one of said prongs to the other, said first rectifier being poled in the direction for supplying charging current to said battery and having one terminal connected directly to one terminal of said battery, a shunt connection between the other terminal of said battery and the other terminal of said first rectifier and including a second dry rectifier, said second rectifier being connected in series with said resistor means and said capacitor means and between the prongs and poled to provide current flow through said resistor and capacitor means in a direction opposite to that provided by said first rectifier, said battery and the elements of said battery charging means being immovably mounted adjacent one another within said casing in close relationship so that they form a compact assembly, said voltage peak-limiting resistor means and said voltage-dropping capacitor means constituting the sole means for reducing the voltage applied to said prongs to the value required to charge said battery.

8. A flashlight according to claim 7 including a resistor having its terminals connected directly to said prongs.

References Cited in the file of this patent

UNITED STATES PATENTS

| | | |
|---|---|---|
| 1,807,331 | Wright | May 26, 1931 |
| 2,072,278 | Schade | Mar. 2, 1937 |
| 2,097,014 | Bates | Oct. 26, 1937 |
| 2,272,040 | Muldoon | Feb. 3, 1942 |
| 2,444,745 | Mosley | July 6, 1948 |
| 2,518,039 | Malki et al. | Aug. 8, 1950 |
| 2,628,339 | Werner | Feb. 10, 1953 |
| 2,642,520 | Coolidge et al. | June 16, 1953 |
| 2,762,907 | Schwartz | Sept. 11, 1956 |

FOREIGN PATENTS

| | | |
|---|---|---|
| 462,458 | France | Nov. 22, 1913 |
| 245,216 | Switzerland | July 1, 1947 |

OTHER REFERENCES

"The Half-Wave Voltage-Doubling Rectifier Circuit" (Waidelich et al.), article in "Proceedings of the I.R.E.," December 1942 (pages 535–541).

"Electronic Circuits and Tubes," by the Cruft Electronics Staff, first edition, published in 1947, by the McGraw-Hill Book Co., Inc. (pages 549–553 and pages 567–569).